United States Patent [19]

Henderson

[11] Patent Number: 5,140,170

[45] Date of Patent: Aug. 18, 1992

[54] POWER GENERATING SYSTEM

[76] Inventor: Geoffrey M. Henderson, 12 Scotston Avenue, Papanui, Christchurch 5, New Zealand

[21] Appl. No.: 705,607

[22] Filed: May 24, 1991

[51] Int. Cl.$^5$ .......................... F03D 7/04; F16H 47/04
[52] U.S. Cl. ......................................... 290/44; 290/55
[58] Field of Search ..................................... 290/44, 55

[56] References Cited

U.S. PATENT DOCUMENTS 4,239,977 12/1980 Strutman ............................. 290/44

FOREIGN PATENT DOCUMENTS

| 720272 | 12/1954 | United Kingdom . |
| 871576 | 6/1961 | United Kingdom . |
| 952982 | 3/1964 | United Kingdom . |
| 1226608 | 3/1971 | United Kingdom . |
| 2136883 | 9/1984 | United Kingdom . |
| 2182121 | 5/1987 | United Kingdom . |
| 2225616 | 6/1990 | United Kingdom . |

Primary Examiner—A. D. Pellinen
Assistant Examiner—Robert Lloyd Hoover
Attorney, Agent, or Firm—Young & Thompson

[57] ABSTRACT

A power generating system comprising a fluid driven rotor, a generator, and a transmission assembly for coupling the rotor to the generator. The transmission assembly is controlled by an hydraulic circuit which comprises a valve which in a first state prevents flow of operating fluid through the circuit and in a second state permits such flow, whereby in the first state torque is transmitted from the rotor to the generator with substantially zero slip, and in the second state the assembly slips so as to permit the rotational speed of the rotor to increase relative to the rotational speed of the generator and maintain a substantially constant torque at the generator.

6 Claims, 4 Drawing Sheets

POWER GENERATING SYSTEM

FIELD OF THE INVENTION

This invention relates to a power generating system of the type in which a fluid driven turbine drives an alternating current generator. This invention is more specifically concerned with such a system wherein the rotational torque of the turbine may vary widely and randomly due to changes in the speed of the fluid driving the turbine. An example of such a power generating system is a wind-driven turbine or windmill.

BACKGROUND TO THE INVENTION

It is a continuing problem with the use of wind-driven turbines to provide a cost-effective method of smoothing the aerodynamic torque input so as to reduce torque fluctuations in the drive train from the turbine input to the generator and to improve the quality of the electrical power output. It is particularly desirable to improve the electrical power output to such an extent that the alternating current generator can take the form of a normal "utility-grade" synchronous generator. At present, most commercial windmills use an induction generator to provide a limited slip characteristic which maintains drive-train torque fluctuations within acceptable limits. Such generators can only provide the power quality of a synchronous generator by expensive modification.

The use of a synchronous generator would be of significant benefit for windmill users. However, use of a synchronous generator requires (and use of an induction generator would benefit from) compliance to reduce the magnitude of the transfer function between the aerodynamic input torque and the drive-train torque to reduce fatigue loading on mechanical parts and to smooth the electrical power output.

PRIOR ART

There have been several attempts to address the problem of excessive drive-train torque fluctuations. In particular, GB 2136883 describes a power generating system in which the rotor of a wind-driven turbine is coupled to an alternating current generator by a differential drive unit which cooperates with an electric or hydraulic machine to control the torque applied to the generator in response to speed changes of the rotor. The system includes a controller which responds to the speed changes in the rotor and which acts on the machine to cause it to act as a generator when the rotor speed increases and as a motor when the rotor speed decreases. While this system might reduce torque fluctuations, it is complex in that it requires a machine capable of rotating in opposite directions and an active controller, with a corresponding electrical control loop, for controlling torque as a function of speed. Further difficulties can arise due to the inertia of the machine itself preventing adequate smoothing of high frequency fluctuations. While this problem can be overcome by a modification to the control loop, this increases the complexity of the system still further.

OBJECT OF THE INVENTION

It is desirable to provide a power generating system with a transmission assembly capable of limiting torque fluctuations in a simple and cost effective manner.

SUMMARY OF THE INVENTION

According to the present invention there is provided a power generating system comprising a rotor adapted to be driven by a fluid, a transmission assembly, and an electrical generator, said rotor being connected to the transmission assembly and the transmission assembly being connected to the generator, said transmission assembly comprising an hydraulic circuit containing a positive displacement hydraulic pump and a valve, said valve being switchable between a first state and a second state, said valve when in first state prevents flow of an operating fluid from the pump through the hydraulic circuit, and when in said second state permits such flow through the hydraulic circuit, whereby in use with the valve at start-up in said first state torque is transmitted from the rotor to the generator via the transmission assembly with substantially zero slip in said transmission assembly, and as the rotor increases in speed the valve switches to the second state whereby the transmission assembly is allowed to slip so as to permit the rotational speed of the rotor to increase relative to the rotational speed of the generator in such a manner as to maintain a substantially constant torque at the generator.

When the valve is in the second state, the hydraulic circuit is preferably such that the flow of operating fluid is unidirectional. With the pump operating thus, the motion of the pump effectively dumps excess energy, enabling the transmission assembly to slip and permitting a constant torque characteristic to be achieved at an output shaft thereof.

In one embodiment, the arrangement is such that the valve (e.g. a relief valve) switches automatically from the first to the second state when the operating fluid reaches a predetermined pressure in the hydraulic circuit (so-called "passive" operation).

In another embodiment, the operating set point of the valve is actively controlled in response to electrical load parameters.

The pump is a positive displacement hydraulic pump (which has a linear relationship between fluid pressure and output torque) which preferably is so arranged that it reacts or transmits the full torque of the turbine and yet converts less than 5% of the mechanical power to hydraulic power. Positive displacement hydraulic pumps are known, and have an inlet and an outlet for hydraulic fluid. The pump may be for example a reciprocating piston and cylinder pump or a rotary vane gear or lobe mechanism. In view of the low speed and high torques encountered in wind driven turbines, a radial piston pump is considered to be particularly suitable.

A fluid orifice can be provided in a bypass path of the hydraulic circuit between the inlet and the outlet of the pump to provide compliance for the transmission assembly.

The hydraulic pump can act as a torque transmission component, in which case it is coupled directly between the rotor and the generator or it can act as a reaction component, in which case it is coupled via a differential drive unit.

The invention is particularly suitable for a wind power generation system in which the turbine comprises a rotor having one or more blades attached to a hub and designed to convert the aerodynamic power of the natural wind into a mechanical torque and an angular velocity. The hydraulic pump is then coupled to the rotor, in one embodiment via a differential drive unit, to enable mechanical power to be transmitted from the rotor to the generator. It is desirable that the rotor speed be independently controllable within predetermined levels in accordance with the geometry of the rotor since, when the transmission assembly slips completely, there is no braking on the rotor for incremental changes in aerodynamic torque. Thus, in the absence of an independent speed control, dangerous acceleration levels would be reached with a high applied torque. The geometry of the rotor may in fact be set by varying the presented pitch of the blades in predetermined manner in accordance with the proposals set out in United Kingdom Patent Application No. 2209806 (inventor: Peter R Dean). Any form of rotor can be used, and by way of illustration FIG. 1 shows a rotor in schematic form only, without the details of the pitch change mechanism.

The turbine can comprise a single rotor, but may instead comprise two or more rotors with or without interposed stators and either mounted on a single shaft or coupled together to rotate at different angular velocities.

The generator may be any suitable alternating current or direct current type, and may run at either the same or a different speed as the turbine. However, as mentioned above it is an advantage of the present invention that a normal synchronous generator can be used.

The "passive" operation embodiment of the invention has the advantage that solely mechanical components are required. There is therefore no reliance on auxiliary controllers and control loops. There are several other advantages over the above-described prior art system. With the prior art system, the energy flow through the reaction machine is continuous, whereas with preferred embodiments of the present invention there is energy flow only above rated torque (apart from the small flow through the orifice to provide slip compliance). With the prior art system, it is necessary to apply an active torque control, the electrical power being controlled by varying the torque on the reaction motor, whereas in the present case the torque control is passive and occurs automatically at a predetermined pressure sensed by the valve. Electrical power can hence be controlled by controlling the speed of the rotor.

Many wind power generating systems include a pitch control mechanism for altering the pitch angle of the turbine blades to maintain power at a fixed level when the available wind power exceeds that level. Periodic and random variations in the wind speed as it strikes the blades makes close power control difficult. The quality of power control depends on the drive train and generator arrangement, in particular on the number of controllable variable parameters. In one common arrangement, rotor speed is preset by the grid into which electrical power is fed by an AC generator and a rigid drive train. In this case therefore the pitch is varied in response to changes in electrical power output. As the speed cannot be varied there is little or no inertial damping possible and power can only be controlled to within plus or minus 25%.

In the arrangement described in the above referenced Patent GB 2136883, both torque and speed are actively controlled, with slip energy being recovered and transferred to or from the interface with the electrical grid. To maintain very tight control could cause system instability between torque and speed control loops. Therefore speed is allowed to vary within plus or minus 5% and power similarly varies within plus or minus 5%.

However it has been noted by the present inventor that if a constant torque is maintained at the drive train, speed can be controlled to within plus or minus 2%. With such a small range of variable speed operation, the turbine can operate efficiently solely on the basis of rotor speed control rather than power control, therefore simplifying the control system. The power generating system can be set up for rated power by suitable adjustment of the control device: in the preferred embodiment by adjusting the pressure at which the valve switches from the first to the second state. By providing an inherently constant torque operation at rated power, the gearbox manufacturer can reduce gear sizing, with cost advantages.

BRIEF DESCRIPTION OF THE DRAWINGS

For a better understanding of the present invention, and to show how the same may be carried into effect, reference will now be made by way of example to the accompanying drawings, in which.

DESCRIPTION OF THE PREFERRED EMBODIMENTS

Figure 1:
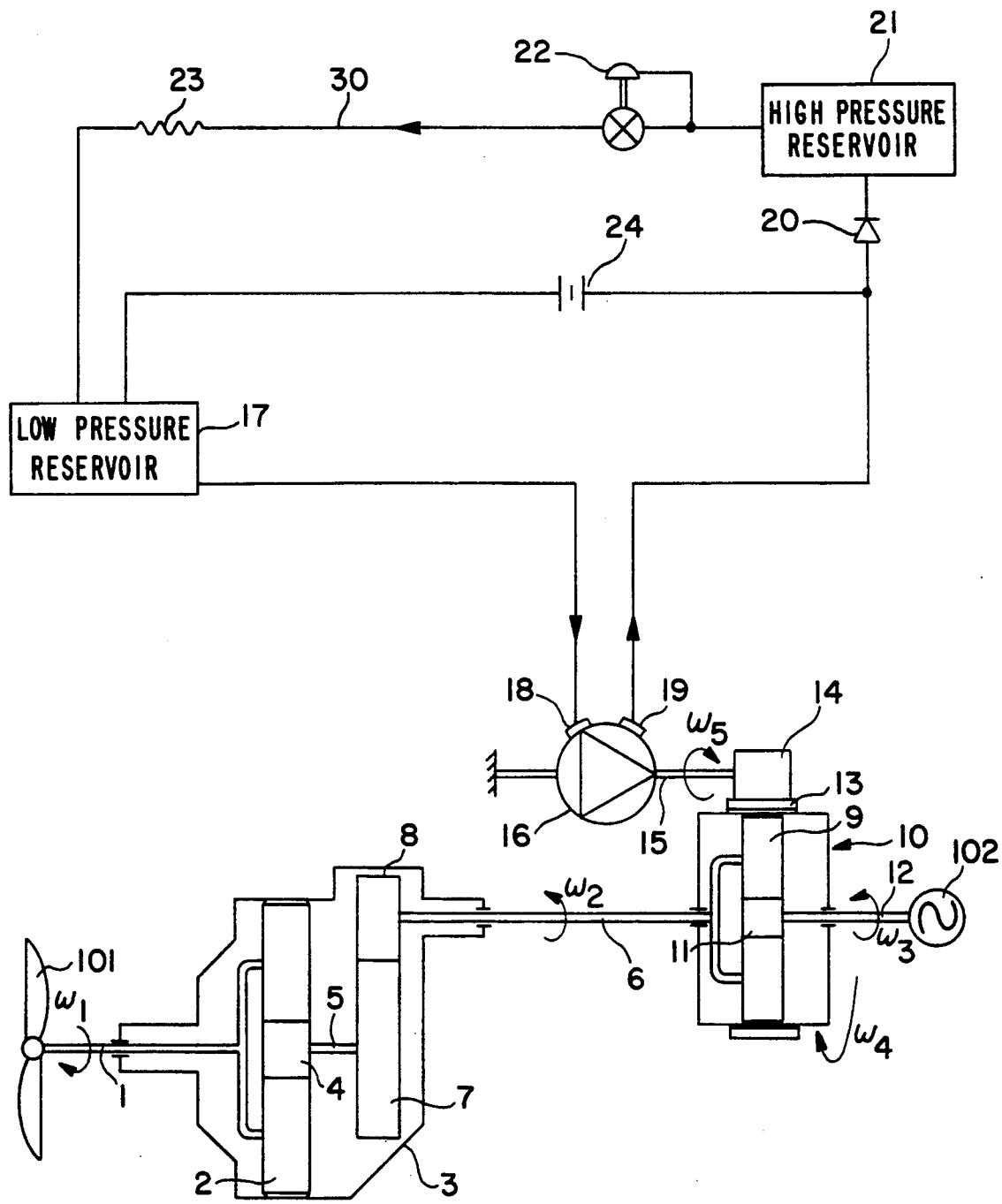
FIG. 1 is a schematic diagram of a power generating system with a torque limiting transmission assembly according to one embodiment of the invention.

Referring to FIG. 1, in a power generating system the shaft 1 of a wind driven turbine rotor 101 provides the input to the ring gear 2 of an epicyclic gearbox 3. The rotational speed of the shaft 1, $\omega$, is typically 48–50 rpm. The sun gear 4 of the epicyclic gearbox 3 carries a shaft 5 which is coupled to a drive shaft 6 via gear 7, 8. Described thus far is the standard two-stage gearbox for a wind turbine. As an example, the gearbox ratio can be 12 to 1, giving an output rotational speed $\omega_2$ of 576–600 rpm. The drive shaft 6 is connected to the planet carrier 9 of a second epicyclic gearbox 10 forming part of a torque limiting transmission assembly or unit for the power generating system. The sun gear 11 of the second epicyclic gearbox 10 is connected to an output shaft 12 which is coupled to the rotor of an alternating current generator 102. The speed of the output shaft 12 $\omega_3$ can be 1500 rpm. With the torque limiting transmission described herein the generator can advantageously be a synchronous generator, although the benefits of the transmission can also be evident if an induction generator is used.

The annulus 13 of the second epicyclic gearbox rotates at a speed $\omega_4$ in the range of 0–24 rpm and engages a spur gear 14 with a ratio of 2 to 1. The spur gear 14 thus rotates with a speed $\omega_5$ of 0–48 rpm. In the described embodiment, the input/output gear ratio of the second epicyclic gearbox for the case where the annulus is stationary ($\omega_4=0$) is 2.6 to 1. A shaft 15 connected to the spur gear 14 is coupled to the drive component (rotor) of a positive displacement hydraulic pump 16, i.e. a pump in which a measured quantity of liquid supplied via an inlet 18 is contained in a space, its pressure is raised and then it is delivered via an outlet 19.

The hydraulic circuit for the pump will now be described. A low pressure liquid reservoir 17 provides operating liquid, for example oil, to the inlet 18 of the pump 16, which expels high pressure liquid from its outlet 19 via a non-return valve 20 to a high pressure reservoir 21. A liquid path 30 connects the high pressure and low pressure reservoirs 21, 17 and includes a relief valve 22 and an air-cooled oil cooler 23. An orifice 24 can be provided between the output 19 of the pump 16 and the low pressure reservoir 17 to provide compliance as described hereinafter. Where an induction generator rather than a synchronous generator is used, such an orifice might not be necessary.

The transmission unit operates as follows. The relief valve 22 is normally closed (first state) to prevent operation of the pump from circulating hydraulic fluid through the hydraulic fluid circuit until the pressure of the liquid in the pump space reaches a predetermined value. With the relief valve 22 closed, the second epicyclic gearbox acts with substantially zero slip (rigid transmission), that is with no slip apart from compliance provided by the orifice 24 when present. When the pressure of the liquid in the pump space reaches the predetermined value, the relief valve 22 opens automatically (second state) and acts as a one-way valve to permit liquid to be pumped around the hydraulic circuit. When the relief valve 22 opens the transmission unit slips; that is, the motion of the pump permits the turbine rotor 101 to increase its angular velocity relative to that of the output shaft 12 to the generator 102.

Figure 2:
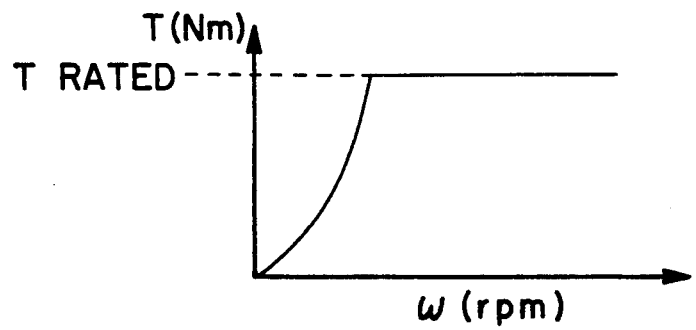
FIG. 2 is a graph of the torque characteristic of the transmission versus speed.

The pressure at which the relief valve 22 opens is set to correspond to an upper limit torque value, preferably the rated torque of the generator. The above-described arrangement thus provides a transmission which is torsionally rigid below rated torque but which slips at the above rated torque to provide a constant torque characteristic, as shown in FIG. 2 which is a graph of torque versus speed. In the graph of FIG. 2, the initial increase of torque and speed, modified by the orifice 24, follows the curve $T = \omega_5^2$.

Prior to reaching the applicable pressure at which valve 22 opens corresponding to the rated torque as indicated by the horizontal curve at FIG. 2, pump 16 rotates slowly to force fluid through orifice 24. The orifice provides a backpressure, providing a torque-speed curve which is shown at FIG. 2 to vary as a function of $\omega_5^2$.

It will be appreciated that, when the pump is operating, there is a waste of energy which is dumped by the pump. This power waste might be up to 4% of the rated power but it should be noted that below rated power the amount of slip energy can be adjusted by selecting a different size of the orifice 24. If a 2% slip characteristic is selected, approximately 2% of the energy will be wasted, which is no more than conventional induction generators. Clearly, the power wastage can be reduced with a smaller slip characteristic which might still be sufficient to damp fluctuations below rated torque. Above rated torque, the amount of energy dumped is irrelevant for the overall energy capture provided that the mean electrical power is at rated value. Nevertheless, above rated value the amount of dumped energy could be adjusted by varying the speed demand set point of the rotor (the set speed for the speed control loop), reducing it to as close as possible to the speed at which the hydraulic pump starts to operate. This would only be desirable if the heat dissipation in the hydraulic circuit were to be a problem. Otherwise, the speed demand set point should be set as high as practicable to maximise energy storage as rotor inertia and to minimise the activity of the pitch control mechanism.

Figure 3:
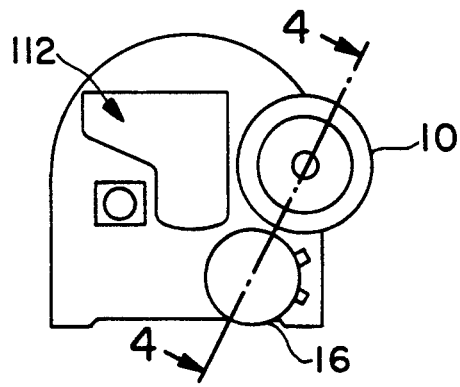
FIG. 3 is a sketched rear view of a torque transmission assembly as shown in FIG. 1.
Figure 4:
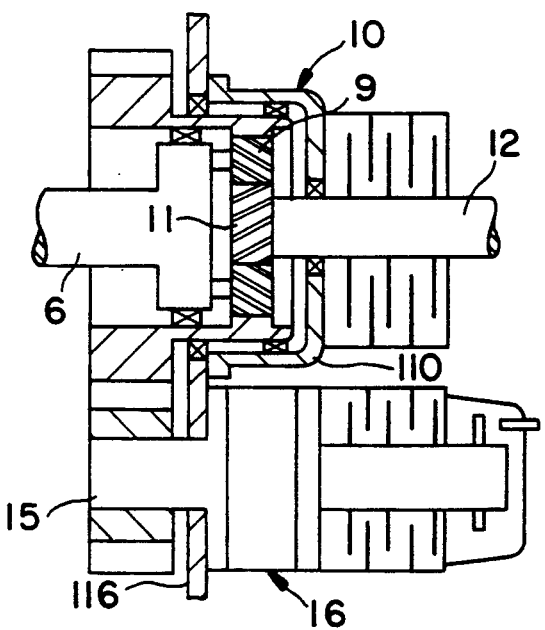
FIG. 4 is part section along line 4—4 of FIG. 3.
Figure 5:
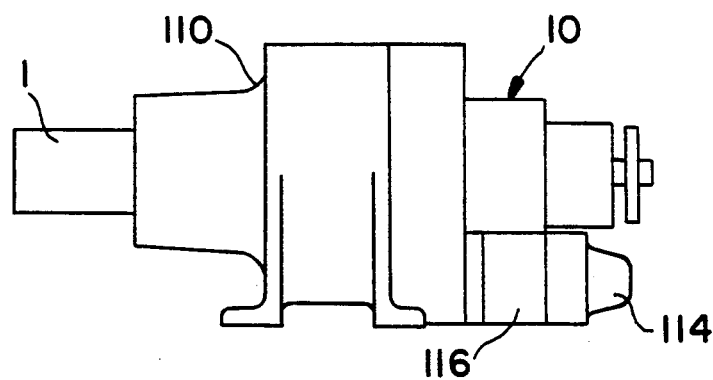
FIG. 5 is a side view of the unit of FIG. 3 with the pitch sensor omitted for clarity.
Figure 6:
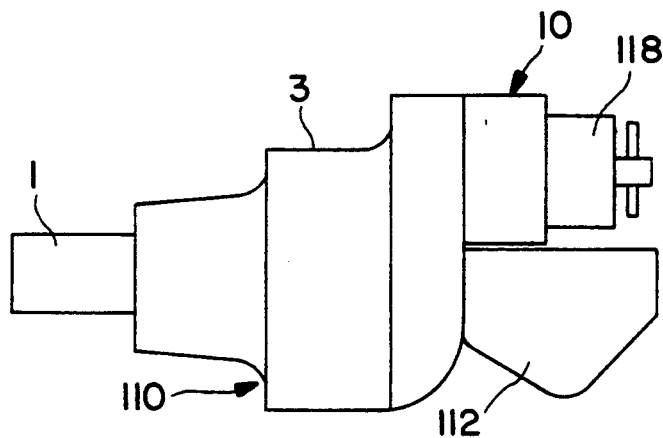
FIG. 6 is a plan view of the unit of FIG. 3.

FIG. 1 is a schematic diagram only. FIGS. 3 to 6 show a practical implementation of the arrangement shown in FIG. 1, where the same reference numerals designate the same parts. The housing 116 of the pump 16 is mounted to the casing 110 of the gearbox 10 and is thereby held stationary. FIGS. 3, 5 and 6 illustrate further components to be found in speed controllable wind turbines, e.g. a pitch sensor 112, a speed sensor 114 and a brake unit 118. The operation of these components is not described herein.

The transmission unit described above is designed to be used in a power generating system having a rotor adapted to be driven by a fluid such as wind. In this case it is highly desirable that the angular velocity of the turbine rotor can be closely controlled, for example to within a range of plus or minus 2%. the reasoning behind this is as follows:

The power equation for a wind turbine can be set out as follows:

$$P = T \cdot \omega$$

where P is the power, T the torque on the drive train and $\omega$ the angular velocity.

Its derivative is $$dP = Td\omega + \omega dT.$$

With constant speed operation, which is the norm for alternating current generators, the equation reduces to $dP = \omega dT$.

However, with constant torque operation the equation reduces to $dP = Td\omega$.

The quality of power from a wind turbine having blade pitch control hence depends on the response speed of the pitch control mechanism relative to the speed at which either the torque or the angular velocity change. Torque change rates are limited by the speed of sound in the affected media and are difficult to control, whereas speed change rates are limited by the inertia of the rotor. As a consequence, the known pitch control mechanisms can control speed to within plus or minus 2% but are only able to limit torque fluctuations to within plus or minus 25%. Therefore, with the transmission unit described above which automatically slips at rated torque to give a constant torque characteristic, power can be controlled to within plus or minus 2% solely by means of speed control of the rotor.

A narrow range of speed variation is highly desirable, since the smaller the energy to be dissipated by the hydraulic circuit, the smaller are the size and cost of the hydraulic components. The energy dissipated by the hydraulic circuit is directly proportional to the speed range. The flow rate in the circuit is a function of the speed of the annulus 13, which in turn is related to the amount of slip. The hydraulic pump has a design limit flow rate (beyond which the pressure and torque would rise) so it is desirable to have tight speed control of the rotor to keep within this limit.

POSSIBLE VARIATIONS OF THE PREFERRED EMBODIMENT

FIGS. 1 to 6 illustrate one embodiment, in which the pump is coupled via a differential drive unit. In another embodiment, shown in FIG. 7, the pump 16' can be mounted integrally within a rotating fluid reservoir 130 with both the rotor and stator of the pump rotating within this reservoir which contains the hydraulic fluid and a relief valve 22'. The stator is connected to the input shaft of the generator and the rotor is connected to the output shaft 6' of a two-stage gearbox 3'. Reference numeral 132 designates cooling fins.

The above described combination of a speed-controlled wind turbine generator and a torque limiting transmission unit using a positive displacement hydraulic pump with a simple hydraulic circuit has very desirable characteristics in wind generation because it allows the considerable inertia of the turbine rotor to smooth the transmission torque and electrical power output by extracting aerodynamic power fluctuations at the rotor, but without compromising efficiency relative to conventional wind turbine generators which use high slip induction generators.

The above described arrangement is particularly suitable for the relatively common situation in which the contribution of electrical power derived from wind turbines is a small proportion of the overall electrical power supplied to a grid, and in which the wind turbine is always to produce as much power as possible up to the rated value. Fluctuations in wind-produced power hence do not have a significant effect on the overall electrical power output quality.

Figure 7:
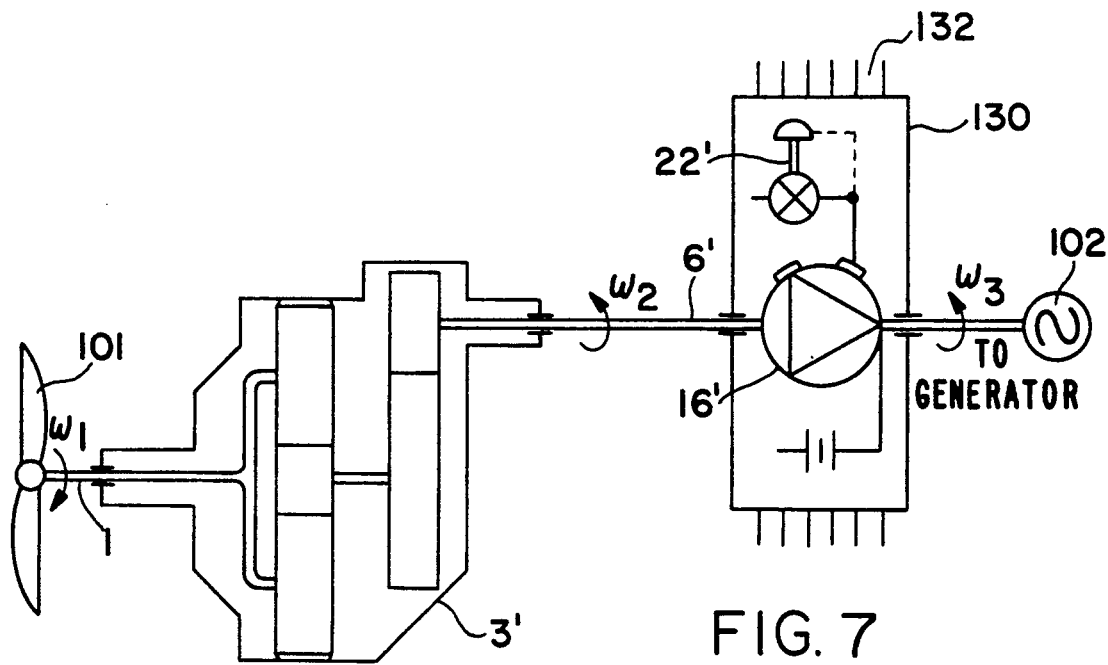
FIG. 7 is a schematic diagram of a torque limiting transmission assembly according to another embodiment of the invention.
Figure 8:
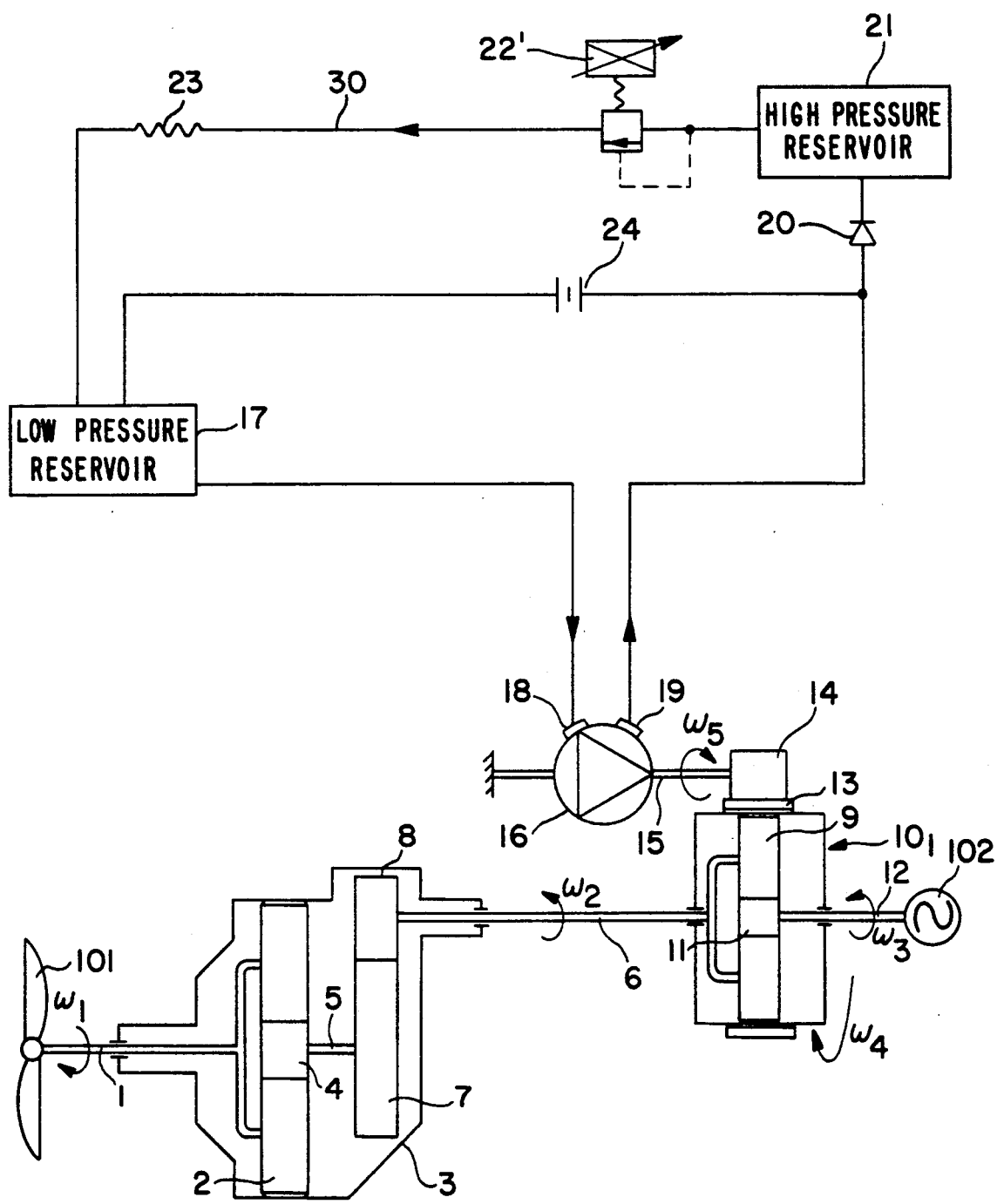
FIG. 8 is a schematic diagram of a power generating system with a torque limiting transmission assembly according to another embodiment of the invention.

However, the system can be modified by replacing the relief valve 22, which responds automatically to the fluid pressure in the hydraulic circuit, with an actively controlled valve 22' as shown in FIG. The FIG. 7 arrangement could be similarly modified. This will enable the maximum power setting of the wind turbine generator to be varied by varying the pressure setting of the valve, using a control loop, in response to:

changes in electrical power or voltage;
changes in electrical frequency;
changes in the slip speed of the hydraulic pump;
any other indications of a mismatch between fluid power input and electrical power output.

Such a modified system would enable a wind turbine generator to be used in situations where the wind generated power is a major part of, or the sole, supplier of electrical power and when the electrical load may be less than the rated power of the wind turbine, without the need for the (currently essential) accessories such as load control, frequency setting generator or controllable 'dump' load.

I claim:

1. A power generating system comprising:
   a rotor adapted to be driven by a fluid, a transmission assembly, and an electrical generator,
   said rotor being connected to the transmission assembly and the transmission assembly being connected to the generator,
   said transmission assembly including an hydraulic circuit containing a positive displacement hydraulic pump and a valve,
   said valve being switchable between a first state and a second state,
   said valve when in said first state prevents substantial flow of an operating fluid from the pump through the hydraulic circuit, and when in said second state permits such flow through the hydraulic circuit,
   whereby in use the rotor is driven by the fluid and the rotor in turn drives the transmission assembly and the transmission assembly in turn drives the generator, the drive of the transmission assembly resulting in the driving of the pump, the driving of the pump pressurizing the hydraulic circuit,
   and with the valve in said first state torque is transmitted from the rotor to the generator via the transmission assembly with substantially zero slip in said transmission assembly,
   but with the valve in the second state the transmission assembly slips so as to permit the rotational speed of the rotor to increase relative to the rotational speed of the generator in such a manner as to maintain a substantially constant torque at the generator.

2. A system as claimed in claim 1, in which the valve automatically switches from the first state to the second state when the operating fluid reaches a predetermined pressure in the hydraulic circuit.

3. A system as claimed in claim 2, further comprising means for varying the pressure at which the valve automatically switches in response to electrical load parameters.

4. A system as claimed in claim 1, in which a fluid orifice is provided in a bypass path of the hydraulic circuit between an inlet and an outlet of the pump to provide compliance for the transmission assembly.

5. A system as claimed in claim 1, in which the hydraulic pump is driven by drive means in the transmission assembly between the rotor and the generator to act as a torque transmission component.

6. A system as claimed in claim 1, in which the pump is coupled by a differential drive unit to the generator to act as a reaction component.

* * * * *